(12) United States Patent
White et al.

(10) Patent No.: US 6,290,749 B1
(45) Date of Patent: Sep. 18, 2001

(54) PREPARATION OF ULTRA-PURE SILVER METAL

(75) Inventors: Weimar W. White, Canaseraga; Gary G. Kiehl, Hilton; Brian P. Cleary, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/456,643

(22) Filed: Dec. 8, 1999

(51) Int. Cl.[7] .................. C22B 3/32; C22B 11/00
(52) U.S. Cl. .................. 75/721; 75/713; 75/343; 75/744; 423/27; 423/34; 423/396
(58) Field of Search .................. 75/744, 343, 721, 75/713; 423/27, 34, 396

(56) References Cited

U.S. PATENT DOCUMENTS

| 2,543,792 | 3/1951 | Marasco et al. |  |
|---|---|---|---|
| 2,614,029 | 11/1952 | Moede . |  |
| 3,554,883 | 1/1971 | Green . |  |
| 5,000,928 | 3/1991 | White | 423/34 |
| 5,749,940 | 5/1998 | Narita | 75/711 |

FOREIGN PATENT DOCUMENTS

| 2018828 | 10/1979 | (GB) . |
| 2336116 | 3/1991 | (GB) . |
| WO 98/58089 | 6/1998 | (WO) . |
| WO 98/58092 | 12/1998 | (WO) . |

OTHER PUBLICATIONS

Japanese Patent Abstract 61276907 Jun. 1986.
Ackerman, John B.; Nordwick, Suzzann M.; Anderson, Corby G.; Krys. L. Ernst, "Hydrometallurgy at the Sunshine Mine Metallurgical Complex", Sunshine Min. Co. Kellog, ID, *Hydrometall. Proc. Milton E. Wadsworth Int. Symp.*, 4th (1993), 477–98. Editors: Hiskey, J. Brent; Warren, Garry W... Publisher: Soc. Min. Metall. Explor., Littleton, Colo.; Chpt. 30, pp 492–493. No month.
Banerjee, R. Das, K. Das, A. and Dasgupta, S., "Kinetics of Silver(I)–Catalyzed Oxidation of Formic Acid by the (Ethylenebis(biguanidine))silver(III) Cation in Acid Perchlorate Media", *Inorg. Chem.*, 1989, 28, 585–588, no month.

*Primary Examiner*—Roy King
*Assistant Examiner*—Tima McGuthry-Banks
(74) *Attorney, Agent, or Firm*—Sarah Meeks Roberts

(57) ABSTRACT

A method for preparing ultra-pure silver from a crude silver mixture containing metallic and/or non-metallic impurities, said method comprising;

dissolving the crude silver mixture in nitric acid to form a crude silver nitrate solution;

adding a first selective reducing agent to the crude silver nitrate solution to precipitate a silver/contaminant matrix and form a partially purified silver nitrate solution;

separating the partially purified silver nitrate solution from the precipitated silver/contaminant matrix;

adding a second selective reducing agent to the partially purified silver nitrate solution to precipitate silver powder; and isolating the silver powder.

20 Claims, 1 Drawing Sheet

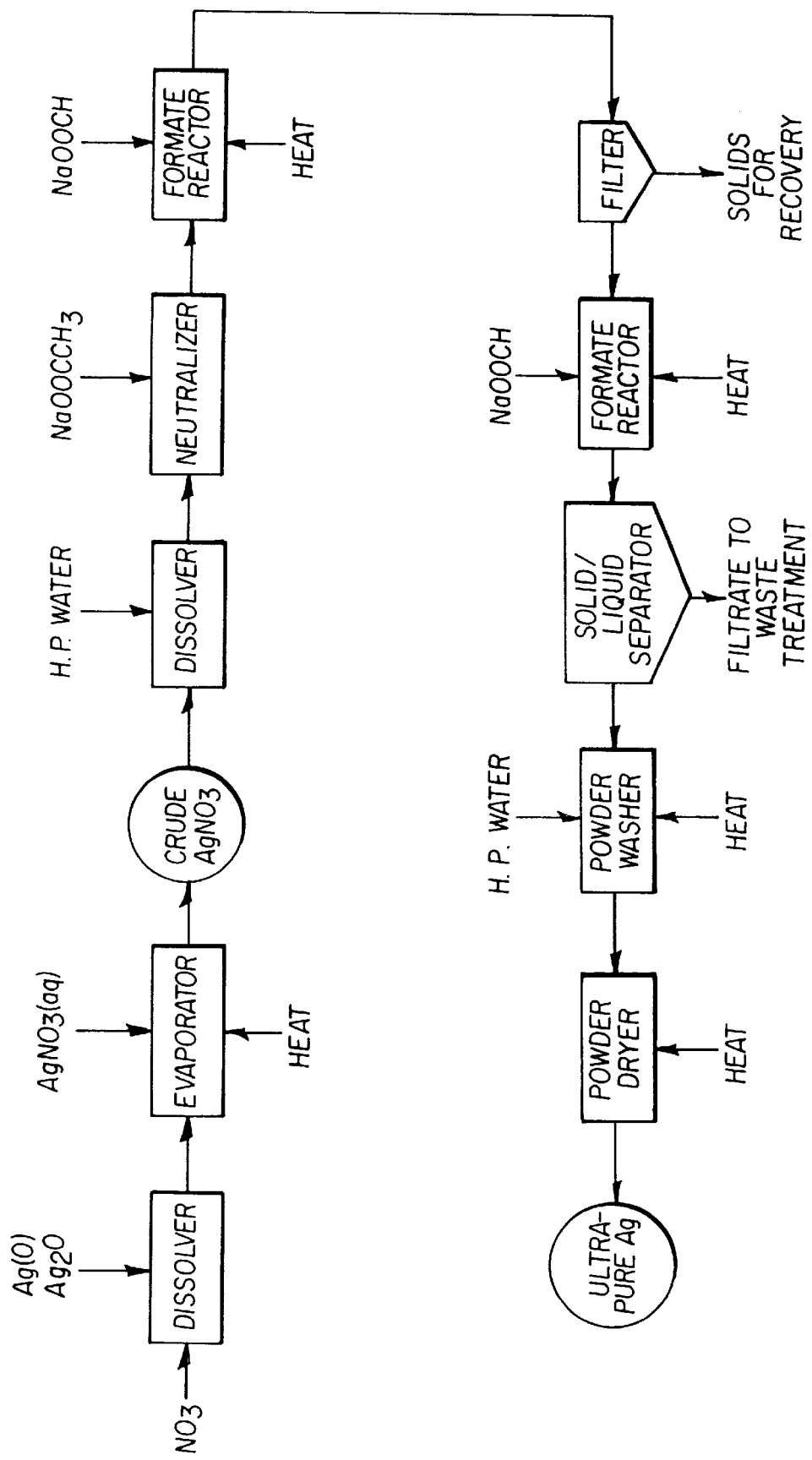

PREPARATION OF ULTRA-PURE SILVER METAL

FIELD OF THE INVENTION

This invention relates to the manufacture of silver metal and in particular to the preparation of silver metal with a very high degree of purity. More specifically, this invention relates to a novel multi-step process for converting impure silver metal containing mixtures to ultra-pure silver metal.

BACKGROUND OF THE INVENTION

Silver that is of very high purity has many important industrial applications including the manufacture of materials in the electronics industry and the preparation of silver nitrate for the photographic industry. Typically, the process for purifying silver relies on smelting, electrolysis or a combination of smelting and electrolysis.

Smelting is a pyrometallurgical process by which crude silver metal and or ionic silver containing compounds are heated in the presence of a flux. The silver ions are chemically reduced to silver metal and as a result of the extreme temperatures of the process, the silver metal melts and drops to the bottom of a reaction furnace. Meanwhile, base metals such as copper, iron, zinc, lead, nickel, etc., if present, remain oxidized and accumulate in the less dense slag waste stream. Finally, the molten silver is poured from the smelter and cooled in a casting. The process of smelting is inefficient with respect to mass balance and requires several days to complete. Furthermore, the precious metals, namely gold, palladium, platinum, rhodium, iridium, osmium and ruthenium remain in the purified silver and require separation during a secondary refining process such as electrorefining. Finally, sulfur and its congeners, selenium and tellurium, if not oxidized in the smelter, will be present in the purified silver and a second refining might be necessary.

Electrorefining also may be used to purify silver. Here, impure silver metal, typically pre-purified by smelting, is cast as an anode and is deposited as purified silver crystals at the cathode in an electrolytic cell. However, in this process silver ions are required to pass through an electrolyte, typically silver nitrate, that may contain an increased concentration of impurities from previously dissolved anodes. Frequent purges of the electrolyte are required to produce silver that is acceptable for use in applications that require high purity. Additionally, varying levels of sulfate, antimony, iron and sulfide are often found to be associated with electrorefined silver.

Hydrometallurgy is a less widely practiced method for refining silver. In practice, aqueous solutions of silver ions are reduced chemically to yield silver metal and, ideally, impurities are left in the aqueous phase. Depending on the identity of the impurities present in the silver matrix, it may be difficult to select a reducing agent of the appropriate strength. While the strength of the reducing agent or its propensity to reduce other species can be obtained from a table of thermodynamic electrochemical reduction potentials; it is not always possible to select a reducing agent that will selectively reduce silver ions to silver powder and leave all of the matrix impurities in a concentrated solid or in the aqueous phase.

The following are representative of the many references describing the purification of ionic silver or the preparation of silver powder from ionic silver solutions. For example, U.S. Pat. No. 5,749,940 describes a process for producing silver from de-copperized anode slime. The method relies on several leaching and separating steps and the one time addition of a reducing agent, dextrose, or hydrazine-a known carcinogen. GB 2,236,116 describes a process of producing silver powders of desired particle sizes from silver nitrate using formate and citrate in a one time addition. JP 61276907 describes the formation of monodisperse silver powders by treatment of aqueous silver nitrate in a gelatin solution with glucose. It also has been reported that crude silver chloride may be converted to silver oxide via the addition of caustic and subsequently reduced to silver metal by dextrose; but the final silver sponge requires secondary purification using electrorefining (Ackerman, John B.; Nordwick, Suzzann M.; Anderson, Corby G.; Krys. L. Ernst. Sunshine Min. Co. Kellog, Id., 83837, USA. Hydrometall. Proc. Milton E. Wadsworth Int. Symp., 4th (1993), 477–98. Editors: Hiskey, J. Brent; Warren, Garry W. Publisher: Soc. Min. Metall. Explor., Littleton, Colo.; Chpt. 30, pp 492–493).

RO 85165 describes a process of producing silver powder from silver nitrate using a one step addition of citric acid. Historically, metallic impurities are removed from aqueous silver ions by treating the matrix with a reagent to precipitate the impurities as metallic hydroxides. U.S. Pat. No. 2,543,792 describes the purification of aqueous silver nitrate with carbon, activated alumina and silver oxide. U.S. Pat. No. 2,614,029 describes the treatment of aqueous silver nitrate with silver oxide to maintain a pH of 6.1, the separation of the metal hydroxides which result from the solution, and the contact of the solution with a water insoluble porous solid absorbent such as activated alumina or magnesia. U.S. Pat. No. 3,554,883 describes a process of mixing silver nitrate with silver oxide to yield a pH of 5.1 to 5.8 causing the formation of a precipitate which is removed. The silver nitrate is subsequently treated with a second addition of silver oxide to yield a pH of 5.9 to 6.3 causing the formation of a second precipitate which is removed yielding a purified silver nitrate solution. Finally, U.S. Pat. No. 5,000,928 describes a process that yields ultra-pure silver nitrate from crude silver using a one time addition of sodium hydroxide to remove metal contaminates as hydroxy or oxy compounds; and a one time addition of sodium formate to yield silver metal which is subsequently converted to ultra-pure silver nitrate.

Even with all of the work which has been done around the purification of impure silver metal, there still remains a need for a less complex process to purify silver. Also needed is a process which has lower silver loss in the recovery stream. This must be accomplished while providing a silver purity level at least as high as that achieved by current technology.

SUMMARY OF THE INVENTION

This invention provides a method for preparing ultra-pure silver from a crude silver mixture containing metallic and/or non-metallic impurities, said method comprising;
  dissolving the crude silver mixture in nitric acid to form a crude silver nitrate solution;
  adding a first selective reducing agent to the crude silver nitrate solution to precipitate a silver/contaminant matrix and form a partially purified silver nitrate solution;
  separating the partially purified silver nitrate solution from the precipitated silver/contaminant matrix;
  adding a second selective reducing agent to the partially purified silver nitrate solution to precipitate silver powder; and
  isolating the silver powder.

This invention is particularly useful when the first and second selective reducing agents are both sodium formate.

The method of the invention has numerous advantages. The inventive process produces silver that is of high enough purity for direct use in the production of photographic quality silver nitrate. The process is simple and employs inexpensive and commercially available reagents for the preparation of the ultra-pure silver metal. The by-products of the silver metal forming reaction are benign and the platinum group metal impurities are collected and concentrated in the first reduction-fraction and can be refined further or sold. The process has lower silver loss in the recovery stream. Finally, the process can be performed within a short time frame.

BRIEF DESCRIPTION OF THE DRAWINGS

The single FIGURE of the drawing is a schematic flow diagram depicting the multi-step process of this invention.

DETAILED DESCRIPTION OF THE INVENTION

The crude silver mixture which is used as the starting material for the manufacture of silver powder in the process of this invention may be any crude silver mixture containing metallic and/or non-metallic contaminants. The contaminants can be any of a very large number and may include, for example, gold, platinum, copper, iron, zinc, lead, nickel, sulfide etc. The inventive process is most useful in purifying crude silver mixtures containing both metallic and non-metallic contaminants. The crude silver mixture can come from a variety of industries and may include the following non-limiting examples: silver formed from smelting purification; silver metal recovered from photographic waste streams; electrolytic cell electrolyte (such as crude aqueous silver nitrate); and silver oxide mud formed during silver nitrate purification.

In the first step of the process, a crude silver containing mixture is dissolved in nitric acid to form a crude silver nitrate solution. The matrix of the mixture may include, but is not limited to, silver metal and silver oxide. The matrix must be soluble in nitric acid and as such precludes silver halides. Dissolution of the silver containing mixture is typically carried out between 90° C. and 100° C., but can be done at any appropriate temperature. The equation for the dissolution of silver metal in nitric acid is described in eq 1 while eq 2 describes the dissolution process for silver oxide.

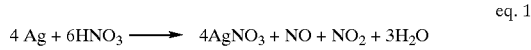

$$4\,Ag + 6HNO_3 \longrightarrow 4AgNO_3 + NO + NO_2 + 3H_2O \quad \text{eq. 1}$$

$$Ag_2O + 2HNO_3 \longrightarrow 4AgNO_3 + H_2O \quad \text{eq. 2}$$

After dissolution and formation of the crude silver nitrate solution, it is preferred that the crude silver nitrate solution is dried, preferably by boiling off the solvent, which results in the formation of a crude silver nitrate solid. While it is possible to continue the process using the crude silver nitrate solution, the advantage of this drying step is two fold. One, all silver matrices can be treated equally after they are converted to the form of solid silver nitrate. Two, since the quantity of acid is reduced during the drying step, subsequent pH adjustments can be made easily with the salt of a weak acid, preferably sodium acetate. The solid silver nitrate is then dissolved in water. Preferably enough water is added to dissolve the solid silver nitrate into a dilute solution, suitably one having a 15 to 25 percent by weight concentration of silver nitrate. Some impurities, such as sulfur which is precipitated as silver sulfide, are much less soluble in a dilute silver nitrate solution and, thus, can be removed as a solid in a subsequent step.

If necessary the silver nitrate solution is then adjusted to a suitable pH level, preferably from about 4.0 to about 4.8, but most preferably from about 4.3 to about 4.5. Preferably the salt of a weak acid is added to adjust the pH The salt of the weak acid also serves to buffer the solution during the first addition of the reducing agent. Alkali salts of acetic acid are preferred because of their low cost and the observation that the silver salt formed during the acetate addition remains in solution. Sodium acetate is the most preferred form. Too high a pH will result in the crystallization of silver acetate while too low a pH results in the dissolution of silver powder produced in the subsequent step.

Following the pH adjustment a selective reducing agent is added to the silver nitrate solution. This may be done within a large temperature range, but preferably at 70 to 100° C. Herein, the term "selective reducing agent" refers to a chemical that will reduce silver nitrate to silver powder and the precious metal contaminants to their respective metal powders, or will cause some contaminates, such as iron, bismuth, tin, and aluminum, to precipitate in the form of compounds. Mercury containing impurities are also presumed to be amalgamated during this addition. Examples of selective reducing agents include formic acid, alkali formates, hydrazine, alkali borohydrides, iron(II) sulfate, tin (II) sulfate, hypophosphorus acid, metal hypophosphites, sulfurous acid, hydroxylamine, organic hydroxy acids such as tartaric acid and ascorbic acid, sugars such as dextrose and glucose, aldehydes, hydroquinone, salts of hydrosulfite, and reducing gases such as carbon monoxide and hydrogen. It is preferable that only a small amount, preferably about 0.003 to about 0.01 mols of the reducing agent per mol of silver and most preferably about 0.003 to about 0.005 mols of the reducing agent to one mol of of silver, is added since the purpose of this step is to precipitate all reducible contaminates into a small, isolable matrix of silver powder. In one suitable embodiment, about 0.005 mols per mol of silver is added. The addition of too much of the first selective reducing agent will lower the final yield of purified silver, while the addition of too little will not precipitate out the contaminants. The precipitated contaminants are referred to herein as the silver/contaminant matrix.

Metal formates, especially alkali formates and most preferably sodium formate, are the preferred selective reducing agents for use in the method of this invention. Sodium formate is particularly preferred because of its high degree of selectivity, its rapid reaction rate, the fact that it does not form degradation products that are detrimental to the reaction system, and its low cost and availability.

The reaction of silver nitrate with sodium formate is described in equations 3–5 below (Banerjee, R.; Das, K.; Das, A.; Dasgupta, S. *Inorganic Chemistry* 1989,28 585–588)

$$AgNO_3 + NaOOCH \longrightarrow Ag(OOCH) + NaNO_3 \quad \text{eq. 3}$$

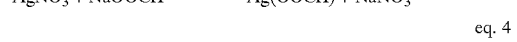

$$AgNO_3 + Ag(OOCH) \longrightarrow 2Ag(0) + HNO_3 + CO_2 \quad \text{eq. 4}$$

$$2AgNO_3 + NaOOCH \longrightarrow 2Ag(0) + NaNO_3 + HNO_3 + CO_2 \text{ (net)} \quad \text{eq. 5}$$

Nitric acid is produced during the reduction according to eq 4 and can dissolve the freshly precipitated silver matrix.

However, the presence of acetate serves to buffer the solution and prevent silver dissolution. Subsequently, the partially purified silver nitrate solution is separated from the silver/contaminant matrix by any suitable means, preferably by filtration. Since this matrix is rich in precious metal contaminates it can be recovered at a later time or sold as gold and palladium enriched silver waste.

After the first addition of the selective reducing agent and removal of the silver/contaminant matrix, the partially purified silver nitrate solution is treated by a second addition of a selective reducing agent. Again, this may be done within a large temperature range, but preferably at 70 to 100° C. The second selective reducing agent may be the same or different from the first selective reducing agent, although it is preferred that they be the same. The addition of the second selective reducing agent reduces substantially all of the remaining silver in solution to silver powder. The silver powder is produced in an environment that is substantially free of reducible impurities since these contaminants were removed in the precipitated silver waste (silver/contaminant matrix) which resulted from the initial reducing agent addition. The non-reducible impurities such as alkali metals, alkaline earth metals, base metals and anions remain in solution and can be separated later from the ultra-pure silver powder.

Normally the second selective reducing agent may be added in the amount of about one mol +/−5% of silver reducing agent per mol of silver. When sodium formate is utilized as the second selective reducing agent, however, it is preferable that at least two mols of sodium formate per mol of silver is added since the excess formate is able to neutralize the nitric acid produced according to eq 4 by forming formic acid. Formic acid is a weak acid; therefore the pH of the solution (and thus the ability of components in the reaction mixture to dissolve the freshly precipitated silver powder) will be governed by the Ka of formic acid, and the concentration of the formic acid and free formate. In the cited examples, silver powder dissolution is minimized using the two fold excess of sodium formate as overall yields approach 100%.

After the second and final selective reduction, the silver powder is separated from the aqueous solution by a suitable procedure such as decantation, centrifugation or filtration, and then may be washed several times with boiling high purity water to remove alkali metal impurities and then dried. The silver powder produced in this manner is suitable for direct use in the manufacture of silver nitrate designated for the manufacture of photographic products or for other processes which require ultra-pure silver. Preferably the resulting silver has a purity of 99.99%.

The following examples are intended to illustrate, but not to limit, the invention.

EXAMPLE 1

In this example, crude silver metal was used which was recovered electrolytically from a photographic fixer waste stream. To 62 mL $HNO_3$ and 10 mL of water was added 50.0 g of crude silver. The mixture was heated between 50° C. and 90° C. until the silver was completed dissolved. The solution was then boiled to dryness and the resulting silver nitrate solid was dissolved in 600 mL of high purity water. The pH was adjusted to 4.5 by the addition of sodium acetate. Next, 0.5 g of sodium formate was added and the solution was boiled for 5 minutes. The reaction mixture was filtered and the filtrate was treated with an additional 50 g of sodium formate. The reaction mixture was boiled until the liquid above the precipitated silver powder was clear. The liquor was decanted from the silver powder and the resulting powder was washed with boiling high purity water three times. After decantation of the final wash, the silver powder was dried at 100° C. for 12 hours.

TABLE 1

Silver Metal Recovered From Photographic Fixer Waste Stream

| Contaminant | Concentration in Crude Silver (µg/g) | Concentration in First Silver Fraction (µg/g) | Concentration in Ultra-Pure Silver (µg/g) |
|---|---|---|---|
| Au | 5.5 | 470 | 0.042 |
| Bi | <0.001 | 0.08 | <0.001 |
| Cd | <0.004 | 0.43 | <0.004 |
| Cr | 1.5 | 30 | 0.015 |
| Cu | 15 | 35 | 0.49 |
| Fe | 15 | 1500 | <0.1 |
| Hg | 0.089 | 8.3 | 0.004 |
| Ir | <0.001 | 0.79 | 0.004 |
| Mn | 0.15 | 13 | 0.003 |
| Na | 20 | 2 | 8.3 |
| Ni | 0.15 | 0.99 | 0.003 |
| Pb | 0.04 | 0.71 | <0.03 |
| Pd | 5.8 | 0.95 | 0.008 |
| Pt | <0.001 | 0.08 | <0.001 |
| Rh | <0.001 | <0.01 | <0.001 |
| Sb | 0.005 | 73 | 0.004 |
| S | 630 | 17000 | 2.2 |
| Se | 0.69 | <3 | <0.02 |
| Sn | 0.23 | 15 | 0.009 |
| Te | <0.001 | 0.1 | <0.001 |
| Zn | 0.20 | 6.6 | 0.045 |

EXAMPLE 2

In this example, electrolyte was used from an electrolytic cell that is operated to refine crude silver metal. The cell electrolyte (98.2 mL) was evaporated to dryness by heating to 100° C. and the resulting solid silver nitrate was dissolved in 600 mL of high purity water. The pH was adjusted to 4.5 by the addition of sodium acetate. Next, 0.5 g of sodium formate was added and the solution was boiled for 5 minutes. The reaction mixture was filtered and the filtrate was treated with an additional 50 g of sodium formate. The reaction mixture was boiled until the liquid above the precipitated silver powder was clear. The liquor was decanted from the silver powder and the resulting powder was washed with boiling high purity water three times. After decantation of the final wash, the silver powder was dried at 100° C. for 12 hours.

TABLE 2

Silver Metal Recovered From Electrolytic Cell Electrolyte

| Contaminant | Concentration in Crude Silver (µg/g) Solution | Concentration in First Silver Fraction (µg/g) | Concentration in Ultra-Pure Silver (µg/g) |
|---|---|---|---|
| Au | 0.009 | 2.9 | 0.08 |
| Bi | 0.84 | 0.49 | <0.001 |
| Cd | 780 | 0.07 | <0.01 |
| Cr | 3.8 | 48 | 0.02 |
| Cu | 1800 | 20 | 2.0 |
| Fe | 15 | 10 | <0.1 |
| Hg | <0.004 | <0.03 | <0.003 |
| Ir | 0.13 | 2.4 | 0.006 |
| Mn | 1.0 | 0.19 | 0.002 |
| Na | 32000 | 65 | 5.4 |
| Ni | 350 | 1.6 | 0.017 |
| Pb | 2400 | 20 | 0.040 |
| Pd | 60 | 660 | 0.17 |

TABLE 2-continued

Silver Metal Recovered From Electrolytic Cell Electrolyte

| Contaminant | Concentration in Crude Silver (µg/g) Solution | Concentration in First Silver Fraction (µg/g) | Concentration in Ultra-Pure Silver (µg/g) |
|---|---|---|---|
| Pt | 0.17 | 2.7 | 0.008 |
| Rh | 0.32 | 10 | 0.03 |
| Sb | 6.1 | 140 | 0.07 |
| S | 110 | 80 | <2 |
| Se | 0.13 | <0.5 | <0.02 |
| Sn | 0.38 | 5.8 | 0.007 |
| Te | 0.008 | 0.71 | <0.001 |
| Zn | 790 | 2.7 | 0.06 |

EXAMPLE 3

In this example, silver oxide mud was used that is generated during the purification of photographic grade silver nitrate. To 62.0 g of dewatered silver oxide mud was added 40 mL of high purity water and 80 mL of nitric acid. The reaction mixture was heated to 90° C. for 0.5 hours and then the solution evaporated to dryness. To the solid silver nitrate sample was added 400 mL of high purity water and the pH was adjusted to 4.5 by the addition of sodium acetate. Next, 0.5 g of sodium formate was added and the solution was boiled for 5 minutes. The reaction mixture was filtered and the filtrate was treated with an additional 50 g of sodium formate. The reaction mixture was boiled until the liquid above the precipitated silver powder was clear. The liquor was decanted from the silver powder and the resulting powder was washed with boiling high purity water three times. After decantation of the final wash, the silver powder was dried at 100° C. for 12 hours.

TABLE 3

Silver Metal Recovered From Silver Oxide Mud

| Contaminant | Concentration in Silver Oxide (µg/g) | Concentration in First Silver Fraction (µg/g) | Concentration in Ultra-Pure Silver (µg/g) |
|---|---|---|---|
| Au | 2300 | 6500 | 0.16 |
| Bi | 190 | 500 | <0.001 |
| Cd | <0.05 | <0.5 | <0.001 |
| Cr | 1900 | 4700 | 2.1 |
| Cu | 21000 | 6000 | 120 |
| Fe | 75000 | 190000 | 11 |
| Hg | <0.05 | <0.1 | <0.005 |
| Ir | 1.8 | 2.2 | 0.003 |
| Mn | 350 | 170 | 0.08 |
| Na | 12 | 25000 | <0.8 |
| Ni | 190 | 70 | 0.09 |
| Pb | 75 | 110 | 0.12 |
| Pd | 1200 | 3400 | 2.7 |
| Pt | 12 | 29 | <0.001 |
| Rh | 13 | 57 | 0.004 |
| Sb | 1100 | 310 | 0.013 |
| S | 470 | 1200 | <0.8 |
| Se | 90 | 120 | 6 |
| Sn | 250 | 74 | 0.012 |
| Te | 92 | 140 | <0.001 |
| Zn | 42 | 9.8 | 0.26 |

EXAMPLE 4

In this example, silver metal that has been refined in a smelter was used. To 50.0 g of smelter silver was added 62 mL of nitric acid. The reaction mixture was heated between 50° C. to 90° C. until the silver metal was dissolved followed by the removal of the solvent by boiling. To the resulting solid silver nitrate solid was added 400 mL of high purity water and the pH was adjusted to 4.5 by the addition of sodium acetate. Next, 0.5 g of sodium formate was added and the solution was boiled for 5 minutes. The reaction mixture was filtered and the filtrate was treated with an additional 50 g of sodium formate. The reaction mixture was boiled until the liquid above the precipitated silver powder was clear. The liquor was decanted from the silver powder and the resulting powder was washed with boiling high purity water three times. After decantation of the final wash, the silver powder was dried at 100° C. for 12 hours.

TABLE 4

Silver Metal Recovered From Smelter Silver

| Contaminant | Concentration in Smelt Silver (µg/g) | Concentration in First Silver Fraction (µg/g) | Concentration in Ultra-Pure Silver (µg/g) |
|---|---|---|---|
| Au | 4.6 | 110 | 0.04 |
| Bi | <0.01 | 0.13 | <0.001 |
| Cd | <0.05 | <0.4 | <0.004 |
| Cr | 0.42 | 11 | <0.008 |
| Cu | 25 | 2.8 | 1.9 |
| Fe | 21 | 210 | 0.59 |
| Hg | 0.11 | 2.9 | <0.003 |
| Ir | 0.005 | 0.09 | 0.003 |
| Mn | 0.23 | 1.4 | 0.004 |
| Na | 80 | * | 20 |
| Ni | 3.6 | 4.4 | 0.003 |
| Pb | 0.11 | 0.58 | <0.03 |
| Pd | 14 | 37 | 0.019 |
| Pt | 0.001 | 0.015 | <0.001 |
| Rh | 0.002 | 0.007 | 0.001 |
| Sb | 2.8 | 69 | 0.03 |
| S | 450 | * | <0.8 |
| Se | 0.6 | 29 | 3.0 |
| Sn | 2.9 | 67 | 0.005 |
| Te | <0.001 | <0.02 | <0.001 |
| Zn | 4.9 | 6.1 | 0.038 |

These examples clearly illustrate the effectiveness that the initial addition of sodium formate has for removing precious metal contaminates. Specifically, Example 3 illustrates the effectiveness for concentrating gold and palladium in the initially precipitated silver matrix. Additionally, Example 3 displays the facility of removing iron containing contaminates and Example 1 clearly demonstrates the effectiveness of mercury removal. Note, both iron and mercury are rigorously controlled contaminates in the manufacture of photographic grade silver nitrate. The fact that the process is carried out using dilute solution of silver nitrate allows for the removal of sulfur as exemplified in Examples 1, 2 and 3. Finally, Examples 2 and 3 illustrate that matrices that possess high copper impurity levels can yield silver powder that is virtually free of copper contamination. In these cases, copper is not reduced by sodium formate and remains present in the aqueous waste stream.

The invention has been described in detail with particular reference to certain preferred embodiments thereof, but it will be understood that variations and modifications can be effected within the spirit and scope of the invention.

What is claimed is:

1. A method for preparing ultra-pure silver from a crude silver mixture containing metallic and/or non-metallic impurities, said method comprising;

dissolving the crude silver mixture in nitric acid to form a crude silver nitrate solution;

adding a first selective reducing agent that will reduce silver nitrate to silver powder to the crude silver nitrate solution to precipitate a silver/contaminant matrix and form a partially purified silver nitrate solution;

separating the partially purified silver nitrate solution from the precipitated silver/contaminant matrix, adding a second selective reducing agent to the partially purified silver nitrate solution to precipitate silver powder; and isolating the silver powder.

2. The method of claim 1 wherein the first and second selective reducing agents are both sodium formate.

3. The method of claim 1 wherein the first selective reducing agent is added in the amount of about 0.003 to 0.01 mols per mol of silver.

4. The method of claim 2 wherein the first selective reducing agent is added in the amount of about 0.003 to 0.01 mols per mol of silver.

5. The method of claim 1 wherein prior to adding the first selective reducing agent the pH is adjusted to from about 4.0 to about 4.8.

6. The method of claim 2 wherein prior to adding the first selective reducing agent the pH is adjusted to from about 4.0 to about 4.8.

7. The method of claim 1 wherein prior to adding the first selective reducing agent the crude silver nitrate solution is dried to form a crude silver nitrate solid which is then redissolved in water.

8. The method of claim 2 wherein to adding the first selective reducing agent the crude silver nitrate solution is dried to form a crude silver nitrate solid which is then redissolved in water.

9. The method of claim 2 wherein the second selective reducing agent is added in the amount of at least 2 mols of sodium formate to 1 mol of silver.

10. The method of claim 5 wherein the pH is adjusted with a salt of acetic acid.

11. The method of claim 10 wherein the salt of acetic acid is sodium acetate.

12. The method of claim 6 wherein the pH is adjusted with a salt of acetic acid.

13. The method of claim 12 wherein the pH is adjusted with sodium acetate.

14. A method for preparing ultra-pure silver from a crude silver mixture containing metallic and/or non-metallic impurities, said method comprising the following steps in order;

dissolving the crude silver mixture in nitric acid to form a crude silver nitrate solution;

drying the crude silver nitrate solution to form a crude silver nitrate solid which is then redissolved in water to form a second crude silver nitrate solution;

adjusting the pH of the second crude silver nitrate solution to from about 4.0 to about 4.8;

adding a first addition of sodium formate in the amount of about 0.003 to 0.01 mols per mol of silver to the pH adjusted crude silver nitrate solution to precipitate a silver/contaminant matrix and form a partially purified silver nitrate solution;

separating the partially purified silver nitrate solution from the precipitated silver/contaminant matrix;

adding a second addition of sodium formate to the partially purified silver nitrate solution to precipitate a silver powder; and isolating the silver powder.

15. The method of claim 14 wherein the pH is adjusted with a salt of acetic acid.

16. The method of claim 15 wherein the salt of acetic acid is sodium acetate.

17. The method of claim 14 wherein the first addition of sodium formate is made in the amount of about 0.003 to about 0.005 mols per mol of silver.

18. The method of claim 14 wherein the second addition of sodium formate is made in the amount of at least 2 mols of sodium formate per 1 mol of silver.

19. The method of claim 17 wherein the second addition of sodium formate is made in the amount of at least 2 mols of sodium formate per 1 mol of silver.

20. The method of claim 19 wherein the pH is adjusted with sodium acetate.

* * * * *